Sept. 3, 1957 C. GERST 2,804,780
POWER TRANSMISSION
Filed July 26, 1955 6 Sheets-Sheet 1

INVENTOR.
Chris Gerst.
BY
E. J Balluff
ATTORNEY.

Sept. 3, 1957 C. GERST 2,804,780
POWER TRANSMISSION
Filed July 26, 1955 6 Sheets-Sheet 2
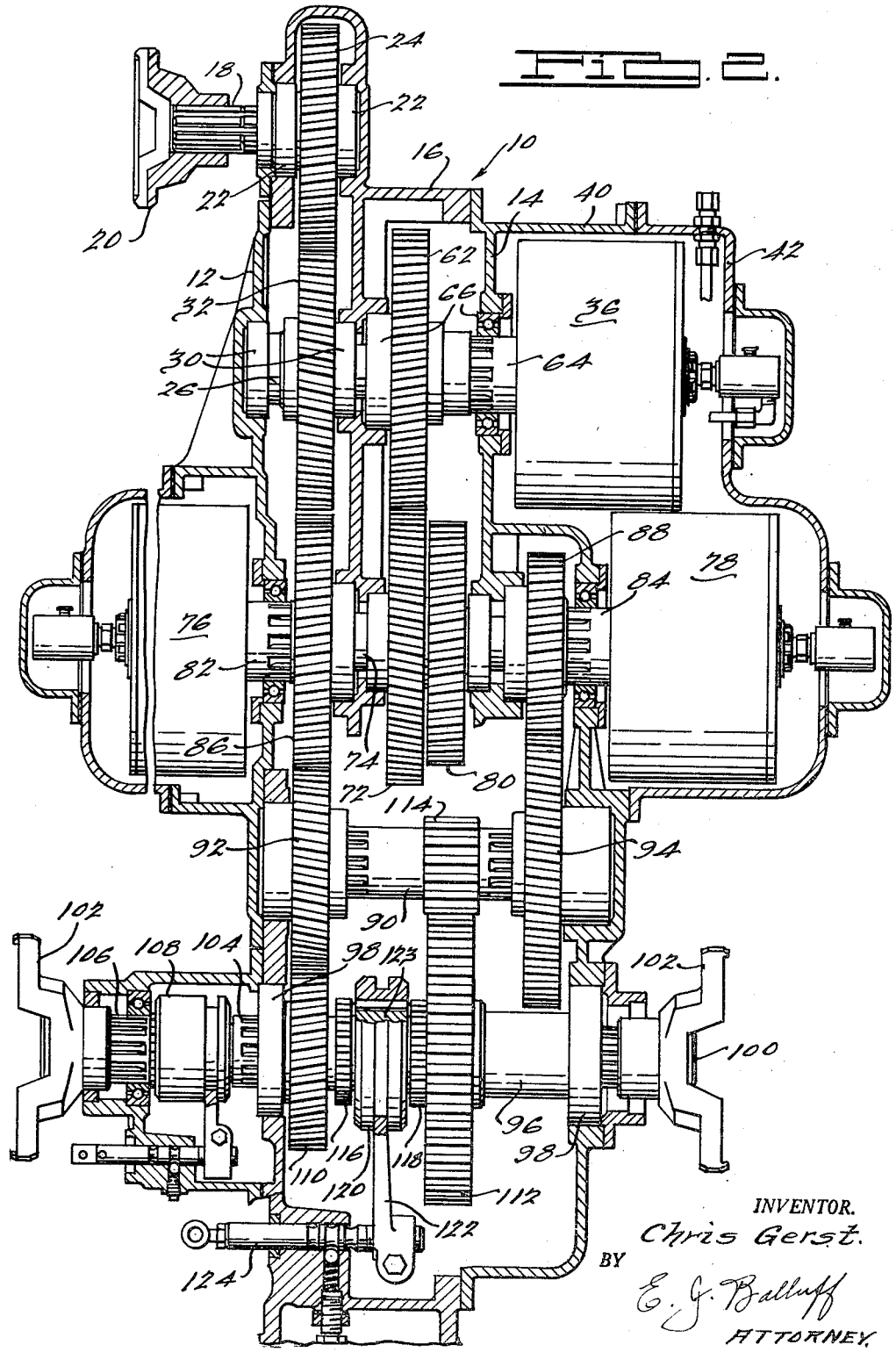
INVENTOR.
Chris Gerst.
BY
E. G. Balluff
ATTORNEY

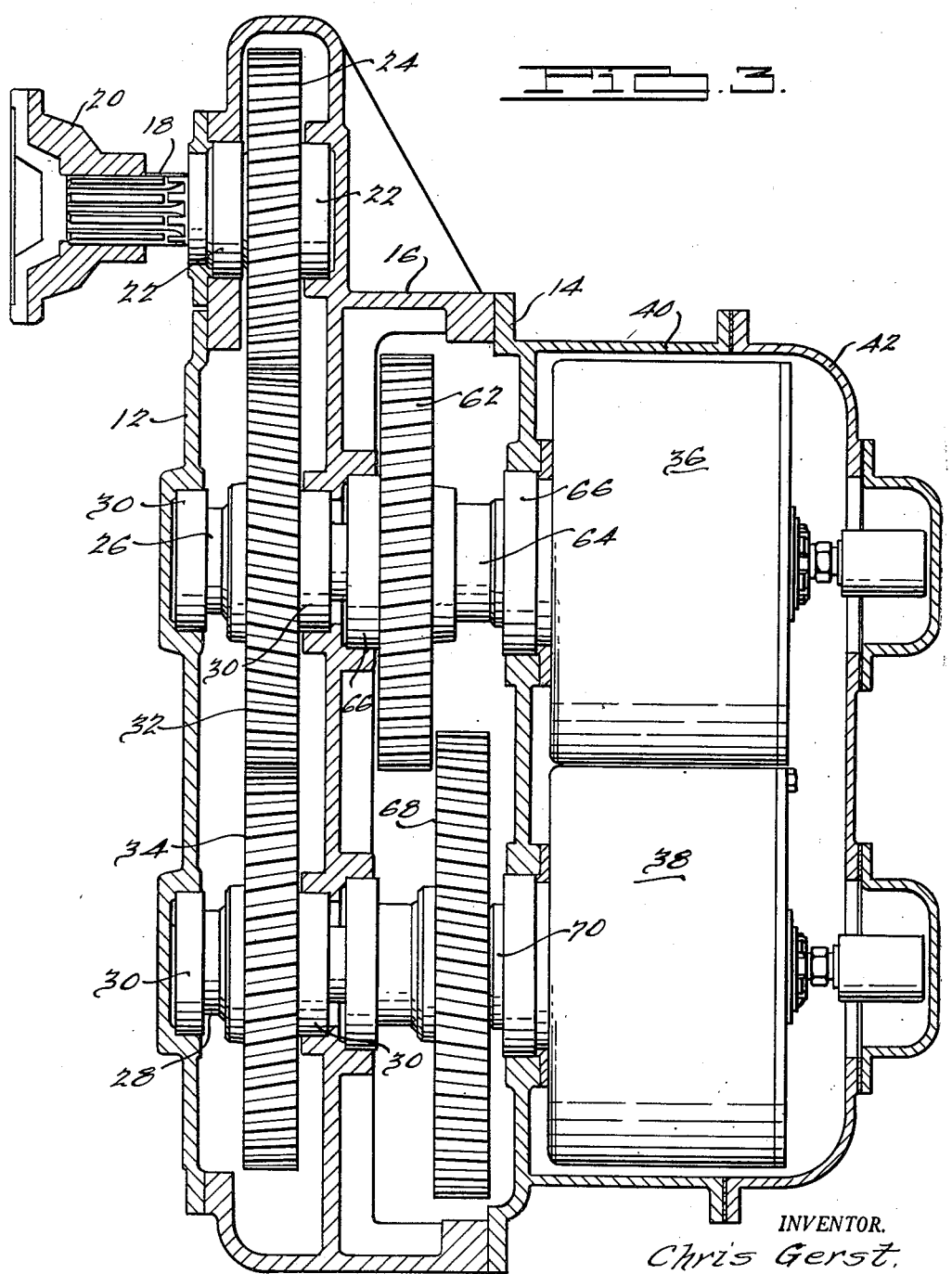

INVENTOR.
Chris Gerst.
BY
ATTORNEY.

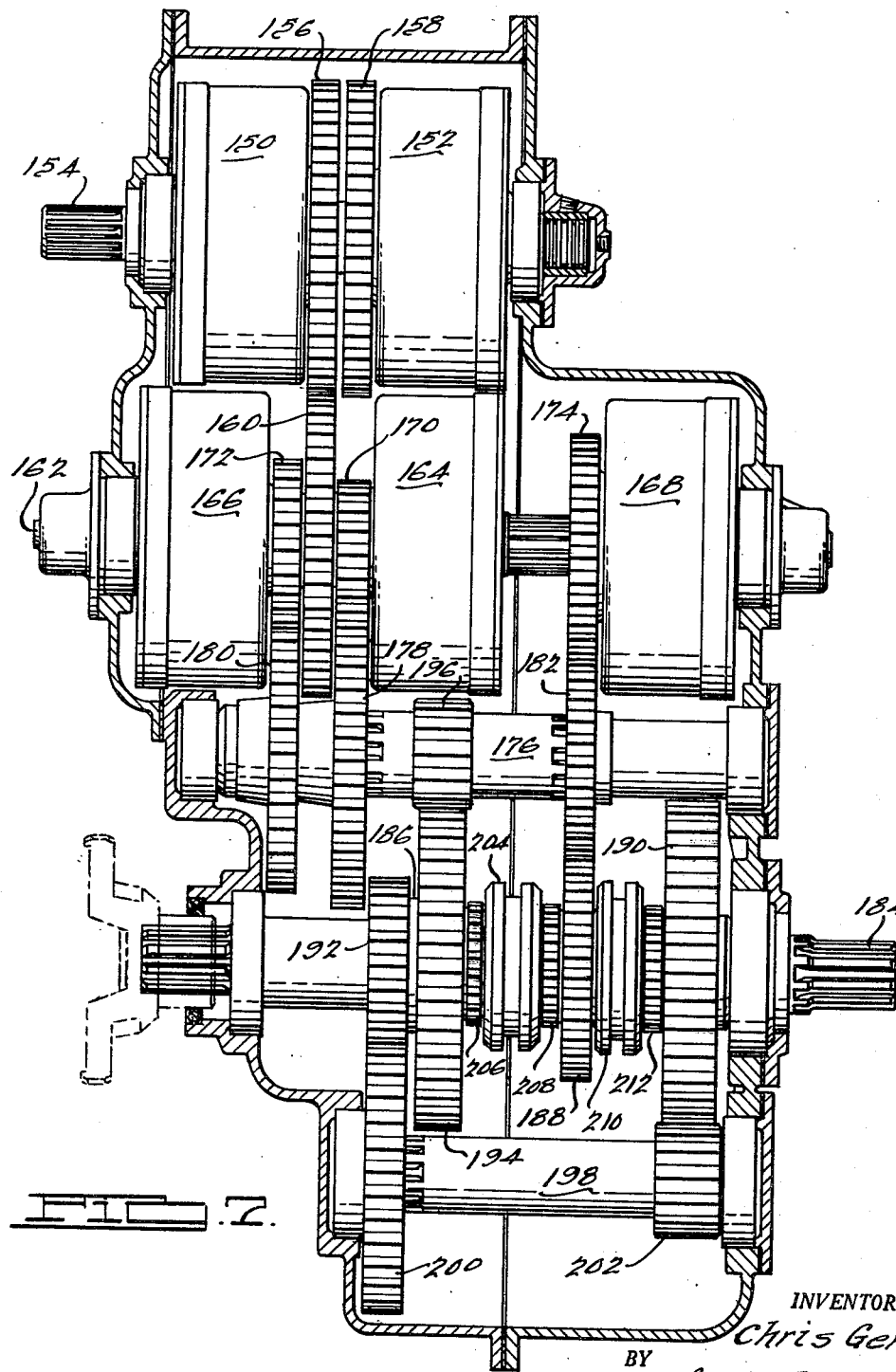

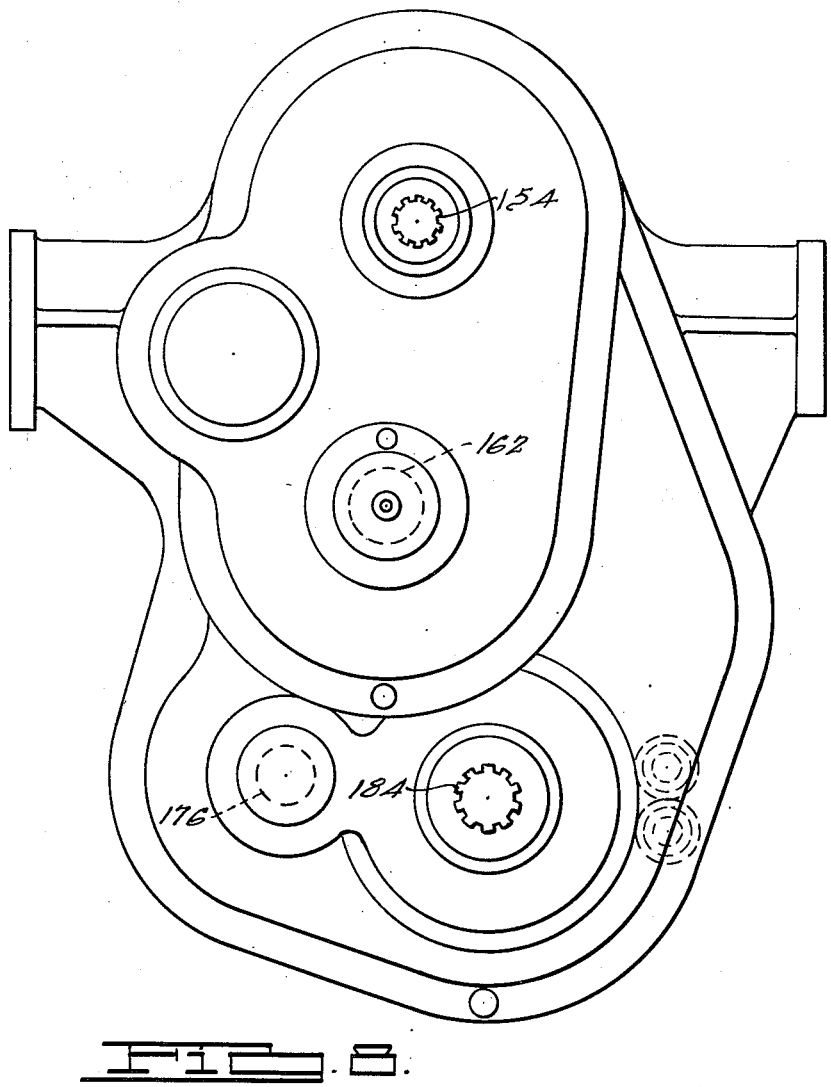

United States Patent Office 2,804,780
Patented Sept. 3, 1957

2,804,780

POWER TRANSMISSION

Chris Gerst, Detroit, Mich., assignor to The Transmission & Gear Company, Dearborn, Mich., a corporation of Michigan Application July 26, 1955, Serial No. 524,418

4 Claims. (Cl. 74—360)

This invention relates to transmissions and more particularly to a multiple-speed forward and reverse drive transmission of the type comprising an input shaft, an output shaft, gear means establishing a plurality of gear trains between the input and output shafts and a plurality of clutch means for driving the output shaft from the input shaft through a selected one of the gear trains.

A principal object of the invention is to provide a new and improved multiple-speed transmission.

A further object of the invention is to provide a transmission in which the output shaft is coupled to the input shaft through a selected gear train by clutch means to drive the output shaft at a selected speed without shifting of gears.

Another object of the invention is to provide a multiple-speed transmission of improved design and including a plurality of clutch means for establishing a selected speed ratio, the clutch means being arranged on a single countershaft to facilitate service and repair thereof.

Other and further objects of the invention will be apparent from the following description and claims and may be understood by reference to the acompanying drawings, of which there are six sheets, which by way of illustration show preferred embodiments of the invention and what I now consider to be the best mode in which I have contemplated applying the principles of my invention. Other embodiments of the invention may be used without departing from the scope of the present invention as set forth in the appended claims.

In the drawings:

Fig. 2 is a partially developed vertical sectional view taken substantially along line 2—2 of Fig. 4;

Fig. 3 is a sectional view taken on line 3—3 of Fig. 1;

Fig. 7 is a sectional view of the modified form of the invention; and

Fig. 8 is an end elevational view of the transmission shown in Fig. 7.

Figure 1:
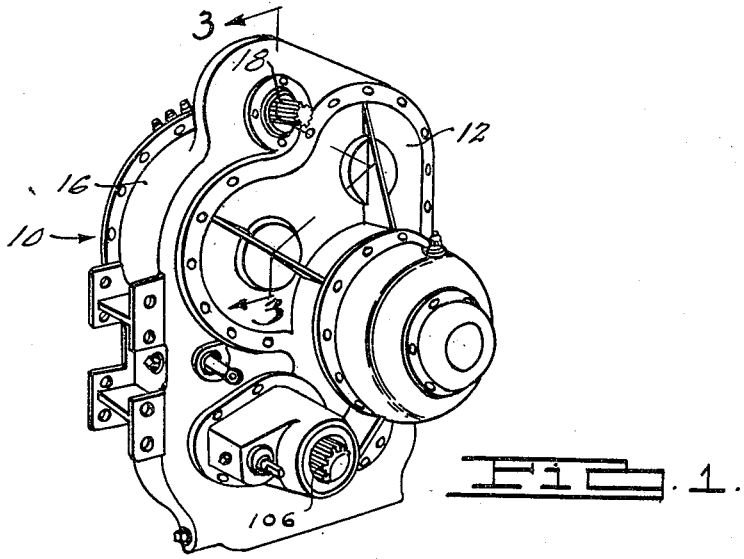
Fig. 1 is a perspective view of a transmission embodying the present invention.

Referring more particularly to the drawings, the transmission housing 10 comprises a front wall 12, a back wall 14, and an intermediate part 16. An input shaft 18 adapted to be driven from the engine through a coupling 20 is journaled in bearings 22 provided in the opposing walls of the housing portion 16 at the upper end thereof. The input shaft 18 has a gear 24 splined thereon. A pair of clutch shafts 26 and 28 are journaled in the housing 10 by bearings 30. The forward drive clutch shaft 26 has a gear 32 secured thereon between its bearings 30 and meshed with input gear 24, and reverse clutch shaft 28 has a gear 34 splined thereon and meshed with gear 32. The gears 32 and 34 and their respective clutch shafts will be driven in opposite directions from input shaft 18.

Figure 6:
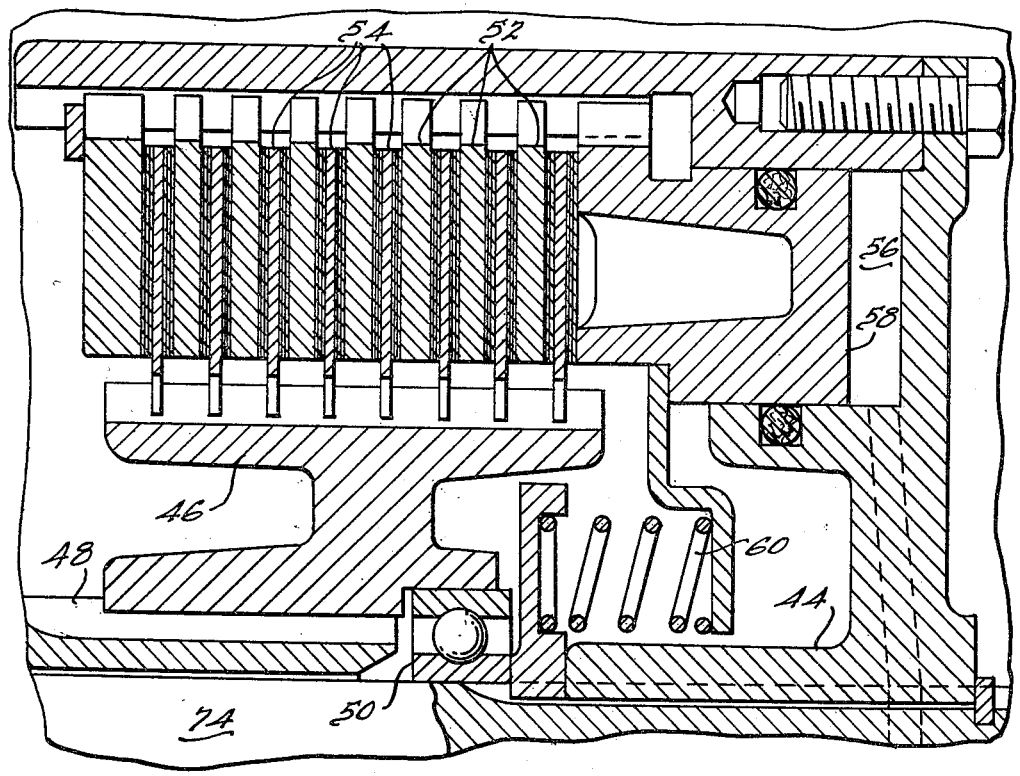
Fig. 6 is an enlarged fragmentary sectional view through one of the clutches.
Figure 4:
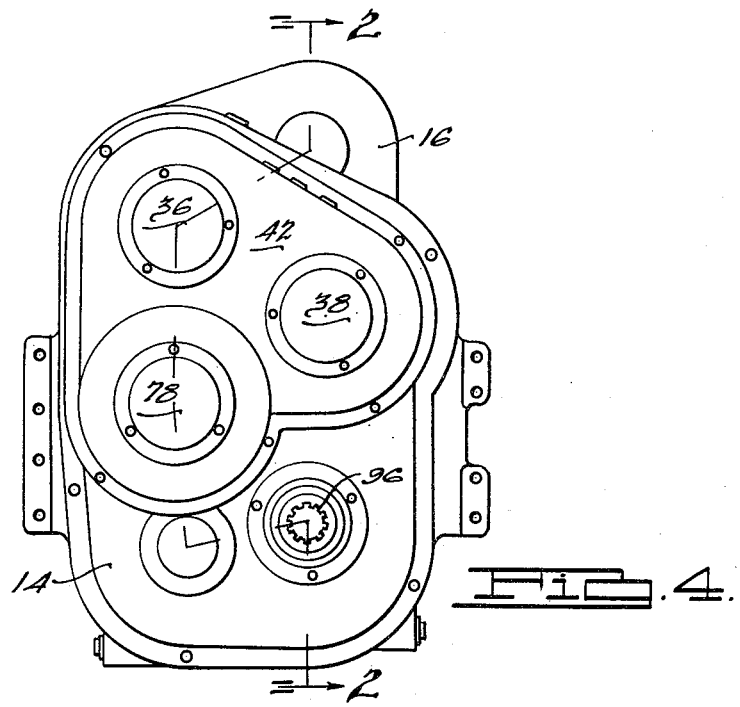
Fig. 4 is an end elevational view of the transmission.

The shaft 26 carries a forward drive clutch 36 on its outer end, and the shaft 28 carries a reverse drive clutch 38 on its outer end. The clutches 36 and 38 are located within a clutch housing which comprises a portion 40 of the housing part 14 and an end plate 42. The clutches 36 and 38, as well as the high-speed and low-speed clutches to be described hereinafter, may be substantially identical in construction and a portion of one of such clutches is shown in Fig. 6 from which it will be seen that the clutch is of the multiple-disk friction type and includes a driving clutch element 44 splined onto the drive shaft and a driven clutch element 46 which is splined onto a tubular driven shaft 48 which is telescoped over and rotatable relative to the drive shaft by means of a bearing 50. The driving element 44 carries a plurality of disks 52 axially slidably and nonrotatably connected to the driving element 44, while the driven element 46 carries a series of pressure plates 54 which are axially slidably and nonrotatably connected to the driven element and disposed between the disks 52. The pressure plates 54 carry friction lining and, when the clutch is engaged, are adapted to frictionally engage the disks 52 to establish a driving connection between the driving and driven elements 44 and 46. The clutch may be hydraulically actuated and, as shown, the hydraulic fluid is supplied into a space 56 behind an axially slidable actuating element 58 which is adapted to engage the adjacent pressure plate. A spring 60 maintains the clutch in normally disengaged condition. Any other suitable type of clutch may be employed rather than the clutch shown in Fig. 6.

A gear 62 is splined onto a sleeve 64 which corresponds to or is integral with the sleeve 48 which has a splined connection with the driven clutch part as described in connection with Fig. 6. The sleeve 64 is journaled in bearings 66 and, when the clutch 36 is actuated, the sleeve 64 and gear 62 secured thereto will be clutched to shaft 26 for rotation therewith in the same direction. A gear 68 is similarly mounted on a sleeve 70 which surrounds shaft 28 and is connected to the driven element of the reverse clutch 38 so that when clutch 38 is actuated the sleeve 70 and gear 68 will be driven with shaft 28.

Gear 62 is meshed with a forward drive gear 72 which is splined onto a countershaft 74 which projects through the front and back walls of the transmission housing. A high-speed clutch 76 is mounted on one end of countershaft 74 and a low-speed clutch 78 is mounted on the other end of the countershaft 74, clutches 76 and 78 being disposed exteriorally of the transmission housing so as to be readily accessible for service and repair. A gear 80 is splined onto countershaft 74 and is meshed with gear 68 so that the countershaft 74 will be driven from gear 62 when the forward drive clutch 36 is engaged or in the opposite direction through gears 68 and 80 when the reverse clutch 38 is engaged.

The high-speed clutch 76 includes a sleeve 82 secured to the driven element of the clutch 76 and a sleeve 84 forms the driven element of clutch 78. The countershaft 74, of course, forms the driving element of both clutches 76 and 78. A gear 86 is splined onto sleeve 82 and a gear 88 is splined onto sleeve 84. Engagement of clutch 76 will couple gear 86 to countershaft 74 which is driven through either the forward or reverse clutch 36 or 38, as described, and engagement of clutch 78 will couple gear 88 to countershaft 74. The hydraulic controls for the clutches 76 and 78, as well as the forward and reverse clutches 36 and 38, are such that both clutches cannot be engaged at the same time.

A second countershaft 90 is journaled in the housing below countershaft 74 and has a pair of gears 92 and 94 splined thereon and respectively meshed with gears 86 and 88. The output shaft 96 is journaled in bearings 98 and projects through both the front and back walls of the transmission. The rear end 100 of the output shaft has a coupling member 102 secured thereon and, at its other end 104, the output shaft 96 is provided with splines to establish a driving connection between the output shaft and a shaft 106 forming an extension of shaft 96 through an axially shiftable and internally splined clutch member 108. When the clutch member 108 is shifted so that its splines engage the splines 104 on the output shaft 96, a drive will be established at both ends of the output shaft, or the end 100 of the output shaft may be driven and extension 106 and its coupling member 102 disengaged therefrom if desired, for example, to establish either a two or four wheel drive for a vehicle.

A gear 110 is rotatably journaled on output shaft 96 and is meshed with gear 92 and a gear 112 is also rotatably journaled on output shaft 96 and is meshed with a small gear 114 secured on the countershaft 90. The gears 110 and 112 include sleeve portions 116 and 118 respectively, each of which are externally splined and adapted to be engaged by an internally splined coupling element 120 which has a splined connection with a central portion 123 of the output shaft 96. The coupling element 120 is shown in its neutral position in Fig. 2 and may be shifted either to the right or left by a yoke 122 which is operated by a shifting lever 124. When the coupling 120 is shifted to the left so that its splines engage the splines on the sleeve 116 of gear 110, the output shaft 96 will be coupled to gear 110 and, similarly, when the coupling 120 is shifted to the right, the output shaft 96 will be coupled to gear 112.

Assuming forward drive clutch 36 to be engaged so that countershaft 74 is driven from gear 62, engagement of the low-speed clutch 78 will couple gear 88 to countershaft 74 so as to drive the gear 94 and countershaft 90 which in turn drives gears 110 and 112 which are journaled on the output shaft. The shifter element 122 may be shifted to the right to drive output shaft 96 through gears 114 and 112 and the output shaft will be driven at low speed through the gear train described. Disengagement of clutch 78 and engagement of clutch 76, with the coupling element 120 establishing a drive between gear 112 and output shaft 96, establishes a second speed for the output shaft. Third speed is provided by engagement of clutch 78 and shifting of coupling 120 to the left to drive the output shaft through gears 88, 94, 92 and 110, and subsequent engagement of clutch 76 establishes a fourth speed ratio through gears 86, 92 and 110. It will be seen that four reverse speeds are provided in a similar manner by driving countershaft 74 through reverse clutch 38 and gears 68 and 80.

Figure 5:
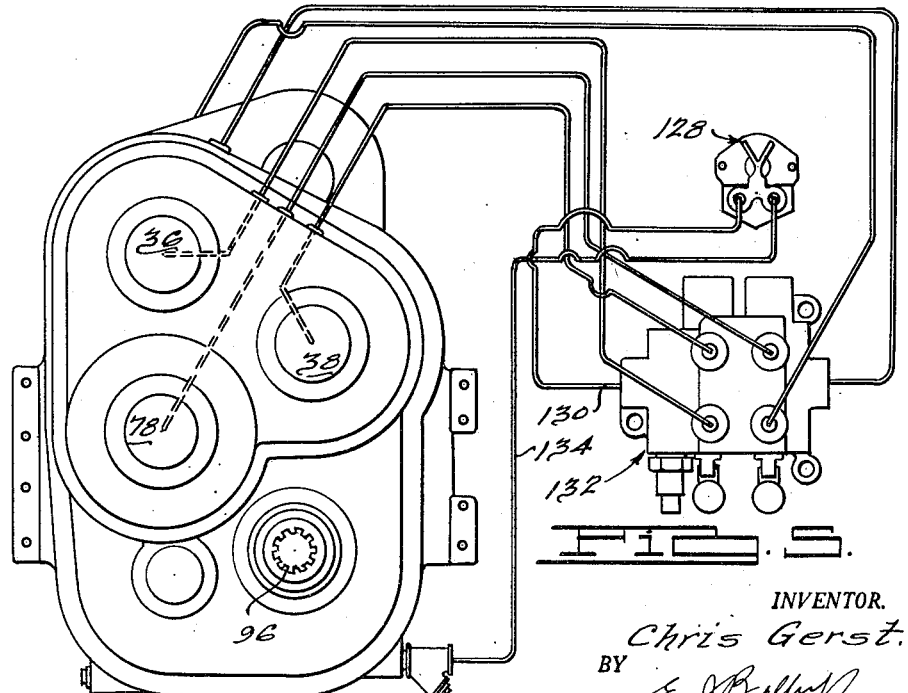
Fig. 5 is a schematic illustration of the hydraulic control arrangement for the clutches employed in the transmission.

The hydraulic controls for the various clutches are illustrated schematically in Fig. 5 and include a hydraulic pump 128 supplying pressure fluid through line 130 to a control valve 132 which may be operated to supply pressure fluid to clutch 36 or clutch 38 and to either clutch 76 or clutch 78, and fluid is returned to pump 128 through a return line 134.

In the modification of the invention shown in Figs. 7 and 8, the forward drive clutch 150 and the reverse drive clutch 152 both have their driving elements splined onto input shaft 154. Gears 156 and 158 are rotatably journaled on input shaft 154 and are secured to the driven elements of their respective clutches 150 and 152. A main drive gear 160 is splined onto countershaft 162 and is meshed with gear 156. Reverse gear 158 is also drivingly connected to gear 160 through an idler gear (not shown) but meshed with gears 158 and 160 so that gear 160 may be driven in either direction by engagement of a selected one of the clutches 150 and 152.

Countershaft 162 has mounted thereon a low-speed clutch 164 and an intermediate clutch 166 and a high-speed clutch 168, all of such clutches and the clutches 150 and 152 being similar to those previously described. The countershaft 162 forms the driving element of the clutches 164, 166 and 168 and the driven elements of such clutches are provided by gears 170, 172 and 174, respectively, the gears 170, 172 and 174 being rotatably journaled on countershaft 162. A second countershaft 176 has gears 178, 180 and 182 secured thereon and respectively meshed with gears 170, 172 and 174. Countershaft 176 may therefore be driven through either one of the three gear trains upon engagement of one of the clutches 164, 166 or 168.

Output shaft 184 has a double gear 186 and gears 188 and 190 rotatably journaled thereon. The double gear 186 includes a small diameter gear 192 and a larger gear 194. Large gear 194 is meshed with a gear 196 secured on shaft 176 and gear 188 is meshed with gear 182. A countershaft 198 has a gear 200 splined thereon and meshed with gear 192 of the double gear 186 and also carries a gear 202 meshed with gear 190. A shifter element 204 similar to that described in connection with Fig. 2 may be shifted to the left to engage splines 206 formed on double gear 186 to couple the gear 186 to output shaft 184, or may be shifted to the right to engage splines 208 formed on gear 188. A similar shifter element 210 may be shifted to the right to engage splines 212 formed on gear 190 to drive output shaft 184 from gear 190. It will be seen that countershaft 176 may be driven at three different speeds in either a forward or reverse direction through engagement of either of the clutches 164, 166 or 168, and three separate gear trains are provided between countershaft 176 and output shaft 184. The output shaft 184 may be driven from any selected one of the three gear trains between countershaft 176 and the output shaft 184 so that a total of nine speed ratios may be established either in forward or reverse drive.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. In a transmission, an input shaft, a countershaft having a drive gear secured thereon and a plurality of gears rotatably journaled thereon on opposite sides of said drive gear, means for driving said drive gear and countershaft from said input shaft in a selected direction of rotation, a second countershaft having a plurality of gears secured thereon each meshed with one of the rotatably mounted gears on said first countershaft, a clutch means for each of said rotatably mounted gears, each clutch means being mounted on said first countershaft outwardly of its said rotatably mounted gear for selectively coupling the latter to said first countershaft for driving said second countershaft therefrom at a selected speed, an output shaft having a plurality of gears rotatably journaled thereon each meshed with a gear on said second countershaft, and means for selectively coupling said output shaft to one of the gears thereon to drive said output shaft at a selected speed from said second countershaft.

2. In a transmission, an input shaft, a pair of clutch shafts, gear means for driving said clutch shafts from said input shaft in opposite directions, a forward drive gear rotatably mounted on one of said clutch shafts and a reverse drive gear mounted on the other clutch shaft, clutch means mounted on said clutch shafts for selectively coupling said drive gears to their respective shafts, a countershaft, gear means secured on said countershaft coupled with said forward and reverse drive gears for driving said countershaft from one of said clutch shafts, a gear rotatably journaled on said countershaft adjacent each end thereof, clutch means mounted on opposite ends of said first countershaft for selectively coupling one of said last-mentioned gears to said countershaft, a second countershaft having a pair of gears secured thereon each meshed with one of the gears on said first countershaft, an output shaft, a pair of gears rotatably journaled on said output shaft, one of said gears being meshed with one of the gears on said second countershaft, a third gear secured on said second countershaft and meshed with the other gear on said output shaft, and means for selectively coupling said output shaft to either of said gears journaled thereon.

3. In a transmission, an input shaft, a countershaft having gear means secured thereon, a pair of clutch shafts disposed parallel to and below said input shaft, a clutch on each clutch shaft having a driving element driven from said input shaft, gears secured to the driven elements of said clutches and meshed with the gear means on said countershaft for driving said countershaft from said input shaft through one of said clutches in a selected direction of rotation, a second countershaft, an output shaft, gear means providing a plurality of gear trains between said countershafts, clutch means for establishing a driving connection from said first to said second countershaft through a selected one of said gear trains, gear means providing a plurality of gear trains between said second countershaft and said output shaft, and means for establishing a driving connection from said second countershaft to said output shaft through a selected one of said last-mentioned gear trains.

4. In a transmission, an input shaft, a countershaft having a main drive gear secured thereon, a pair of gears mounted on said input shaft and drivingly connected to said drive gear, a pair of clutches mounted on said input shaft for selectively coupling one of said gears to said drive gear to drive said countershaft from said input shaft in a selected direction of rotation, a second countershaft, an output shaft, gear means providing a plurality of gear trains between said countershafts, clutch means for establishing a driving connection from said first to said second countershaft through a selected one of said gear trains, gear means providing a plurality of gear trains between said second countershaft and said output shaft, and means for establishing a driving connection from said second countershaft to said output shaft through a selected one of said last-mentioned gear trains.

References Cited in the file of this patent
UNITED STATES PATENTS 895,105    Newton _____ Aug. 4, 1908